United States Patent
Son

(10) Patent No.: US 7,236,805 B2
(45) Date of Patent: Jun. 26, 2007

(54) PROGRAM SHARING METHOD USING BOARD IDENTIFICATIONS IN A MOBILE COMMUNICATION SYSTEM

(75) Inventor: Jeong-Dae Son, Suwon-shi (KR)

(73) Assignee: Samsung Electronics Co., Ltd. (KR)

( * ) Notice: Subject to any disclaimer, the term of this patent is extended or adjusted under 35 U.S.C. 154(b) by 564 days.

(21) Appl. No.: 10/007,058

(22) Filed: Dec. 4, 2001

(65) Prior Publication Data
US 2002/0151299 A1    Oct. 17, 2002

(30) Foreign Application Priority Data
Feb. 6, 2001    (KR)    ................ 2001-05578

(51) Int. Cl.
*H04B 1/38*    (2006.01)
(52) U.S. Cl. .............. 455/560; 455/550.1; 455/445; 455/561; 455/422.1
(58) Field of Classification Search ............. 455/560, 455/558, 561, 347, 348, 557, 550.1, 445, 455/422.1; 570/331, 335
See application file for complete search history.

(56) References Cited

U.S. PATENT DOCUMENTS

| | | | | |
|---|---|---|---|---|
| 5,842,138 A | * | 11/1998 | Lu et al. ................ | 455/560 |
| 5,930,513 A | * | 7/1999 | Taylor ..................... | 717/174 |
| 5,940,743 A | * | 8/1999 | Sunay et al. ............... | 455/69 |
| 5,978,589 A | * | 11/1999 | Yoon ...................... | 717/178 |
| 6,032,255 A | * | 2/2000 | Shim et al. ................ | 713/2 |
| 6,216,014 B1 | * | 4/2001 | Proust et al. ............. | 455/558 |
| 6,671,522 B1 | * | 12/2003 | Beaudou ................. | 455/558 |
| 6,751,658 B1 | * | 6/2004 | Haun et al. ............... | 709/222 |
| 2001/0029560 A1 | * | 10/2001 | Delchini ................. | 710/103 |
| 2004/0153526 A1 | * | 8/2004 | Haun et al. .............. | 709/217 |

* cited by examiner

*Primary Examiner*—Joseph Feild
*Assistant Examiner*—Khai Nguyen
(74) *Attorney, Agent, or Firm*—The Farrell Law Firm

(57) ABSTRACT

There is provided a program sharing method using board IDs in a mobile communication system. When power is on, a shared execution file is executed for a plurality of target board in the system. The ID of each target board is read and hardware is initialized according to the target board IDs. An operating system (OS) for each target board is initialized according to the ID of the target board. A branch routine for each target board is invoked according to the target board ID and an application program is implemented for the target board.

11 Claims, 2 Drawing Sheets

PROGRAM SHARING METHOD USING BOARD IDENTIFICATIONS IN A MOBILE COMMUNICATION SYSTEM

PRIORITY

This application claims priority to an application entitled "Program Sharing Method Using Board IDs in Mobile Communication System" filed in the Korean Industrial Property Office on Feb. 6, 2001 and assigned Serial No. 2001-5578, the contents of which are hereby incorporated by reference.

BACKGROUND OF THE INVENTION

1. Field of the Invention

The present invention relates generally to a mobile communication system, and in particular, to a method for sharing an execution file among a plurality of target boards using board IDs in a mobile communication system.

2. Description of the Related Art

As shown in FIG. 1, a mobile communication system generally includes an MSC (Mobile Switching Center) 100, a BSM (Base Station Manager) 106, BSSs (Base Station Systems) 102 and 104, BTSs (Base Transceiver Stations) 108, 110, and 112, and MSs (Mobile Stations) (not shown). BSS 102 is connected to a plurality of BTSs 108, 110, and 112, for transmitting signals received from BTSs 108, 110, and 112 to MSC 100 and transmitting signals received from MSC 100 to MSs through BTSs 108, 110, and 112. BSS 102 is provided with target function boards to process signals exchanged between MSC 100 and BTSs 108, 110, and 112. Though not shown in FIG. 1, BSS 104 would have a similar configuration as to that of BSS 102, including the target function boards.

Execution files are prepared separately for respective target boards in a BSS as shown in Table 1 and managed by the BSM.

TABLE 1

| Target Board | A | B | C | ... n |
|---|---|---|---|---|
| Execution file | | | | |
| Separate loading & running | Boot, OS, AP for target A | Boot, OS, AP for target B | Boot, OS, AP for target C | ... Boot, OS, AP for target n |
| Integrated loading & running | Execution file for target A | Execution file for target B | Execution file for target C | ... Execution file for target n |

In the conventional mobile communication system a plurality of target boards (Target Board A, B, C . . . n) are included in each BSS. Each target board requires its own respective execution files. Each target board must store and execute the files within its own resources. This results in duplication of program files stored in the same BSS, and results in management complexity for the BSS in the BSM.

SUMMARY OF THE INVENTION

It is, therefore, an object of the present invention to provide a method of sharing an execution file among a plurality of target boards using board identifications (IDs) in a mobile communication system.

The foregoing and other objects can be achieved by providing a program sharing method using board IDs in a mobile communication system. When power to the system is turned on, a shared execution file is executed for a plurality of target boards in the system. The ID of each target board is read and hardware is initialized according to the target board IDs. An operating system (OS) for each target board is initialized according to the ID of the target board. A branch routine for each target board is invoked according to the target board ID, and an application program is implemented for the target board according to the target board ID.

BRIEF DESCRIPTION OF THE DRAWINGS

The above and other objects, features and advantages of the present invention will become more apparent from the following detailed description when taken in conjunction with the accompanying drawings in which.

DETAILED DESCRIPTION OF THE PREFERRED EMBODIMENT

A preferred embodiment of the present invention will be described hereinbelow with reference to the accompanying drawings. In the following description, well-known functions or constructions are not described in detail since they would obscure the invention in unnecessary detail.

Figure 1:
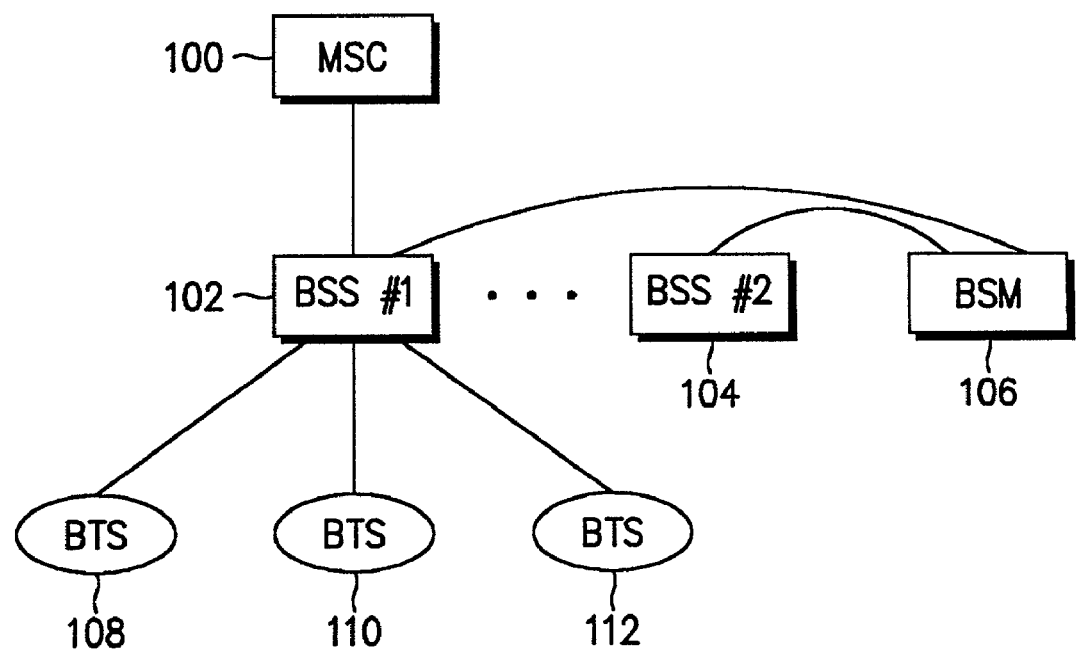
FIG. 1 illustrates the configuration of a mobile communication system to which an embodiment of the present invention is applicable.
Figure 2:
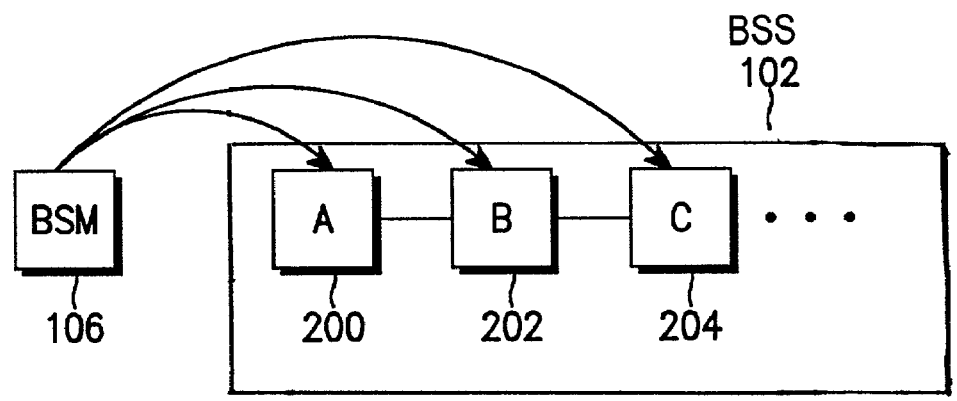
FIG. 2 is a schematic view illustrating a BSM system to which the embodiment of the present invention is applicable.

FIG. 2 illustrates a BSM system according to an embodiment of the present invention. Referring to FIG. 2, BSM 106 stores an execution file that is to be shared among a plurality of target boards 200, 202, and 204 in a BSS 102. This configuration is shown in Table 2. BSM 106 implements the execution file for each board when power is initially supplied to the system.

TABLE 2

| | Target board | A B C ... n |
|---|---|---|
| Execution file | Separate loading & running | One shared boot, OS, and AP |
| | Integrated loading & running | One shared execution file |

As shown in Table 2, BSM 106 manages a shared execution file for target boards 200, 202, and 204 located in BSS 102 and assigns unique IDs to target boards 200, 202 and 204 according to the embodiment of the present invention. The shared execution file is complied as a single execution file to include program code for each target board. Upon the system running the execution file, the program branches into corresponding routines for different target board functions according to the target board IDs. The target board IDs are assigned in both software and hardware so that they cannot be deleted at power off.

Figure 3:
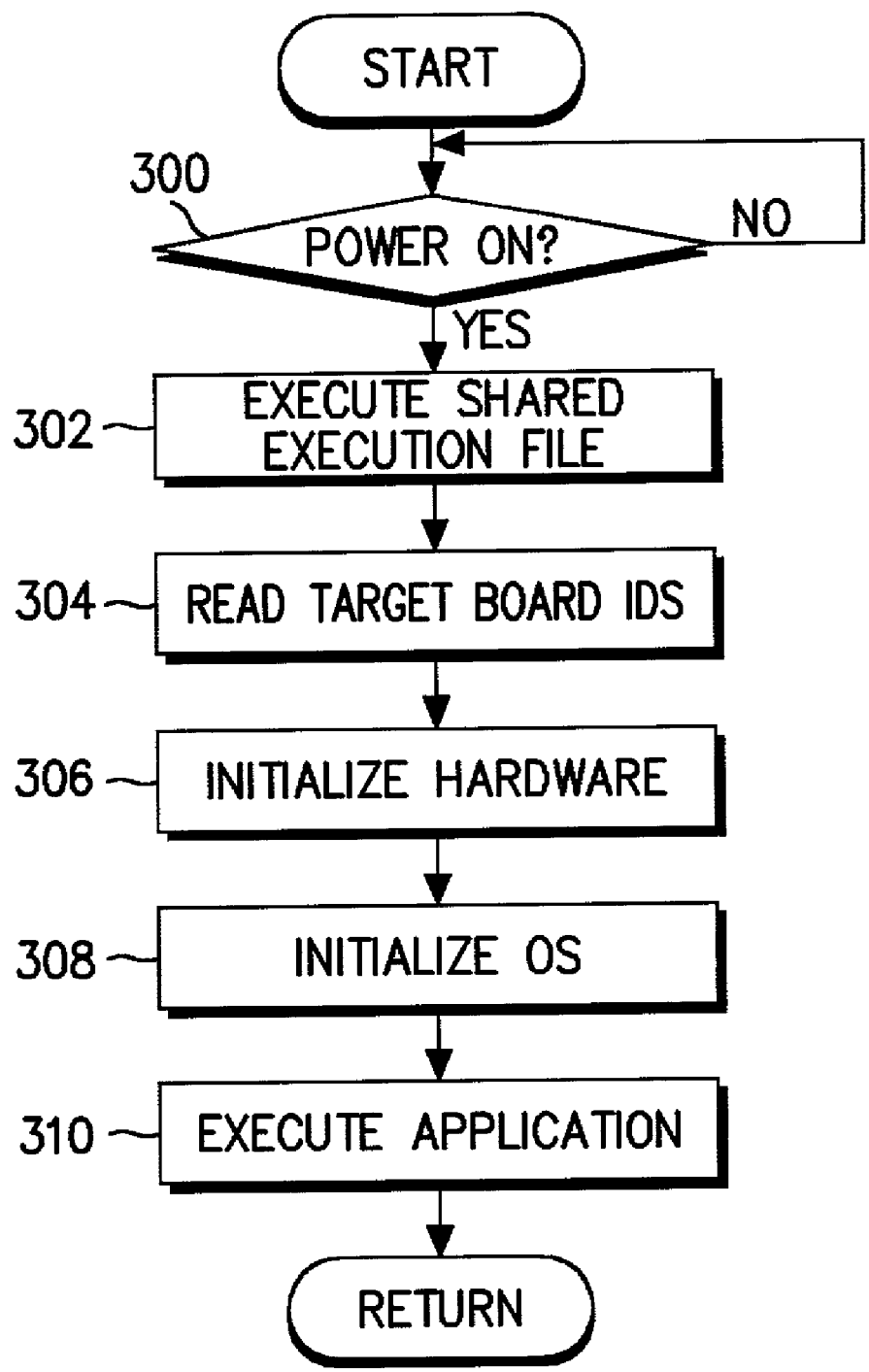
FIG. 3 is a flowchart illustrating a program sharing method using board IDs according to the embodiment of the present invention.

FIG. 3 is a flowchart illustrating a control operation of a BSM for sharing a single execution file among a plurality of target boards of a BSS according to the embodiment of the present invention.

Referring to FIGS. 2 and 3, in step 300 it is determined if all target boards 200, 202, and 204 in BSS 102 are powered-on. If it is determined that not all target boards 200, 202 and 204 are powered-on the process returns to start. This insures that all of the target boards are in a state for the execution file to be run. If it is determined in step 300 that all of the target boards 200, 202 and 204 are powered-up, then in step 302 BSM 106 executes a shared execution file for the target boards 200, 202, and 204. The processor of each target board reads a corresponding board ID and sets an arbitrary variable to the board ID in a predetermined area of a memory in step 304. The processor initializes the hardware according to the target ID in step 306. The hardware initialization varies with the hardware structure in each target board.

Next in step 308, the processor initializes an operating system (OS) for the corresponding target board using the target board ID. Since the OS also varies according to the hardware structure or running conditions, the OS operates differently according to target board IDs. The processor branches into processing sub-routines for the corresponding target board according to the target board ID and executes a corresponding application program in step 310. The application program may be different according to target board functions. Therefore, the processor reads the corresponding target board ID and branches into a corresponding application routine. Consequently, each target board can be operated with a single shared execution file for a common function in the target boards.

In accordance with the present invention as described above, a single shared execution file is stored and executed for a plurality of target boards using target board IDs in a mobile communication system. As a result, multiple execution files are integrated into one master execution file, thus reducing the memory requirements of the overall system.

While the invention has been shown and described with reference to a certain preferred embodiment thereof, it will be understood by those skilled in the art that various changes in form and details may be made therein without departing from the spirit and scope of the invention as defined by the appended claims.

What is claimed is:

1. A method of sharing a program using target board identifications (IDs) in a mobile communication system, comprising the steps of:
   executing by a main processor a shared execution file for a plurality of target boards in the system when power is supplied to the system, said main processor apart from said plurality of target boards;
   reading by the main processor a target board ID of each target board;
   initializing by the main processor target board hardware according to the target board ID;
   initializing by the main processor an operating system (OS) for each target board using the target board ID; and
   branching by the main processor into a sub-routine for each target board according to the target board ID and executing by the main processor an application program for the target board.

2. The method of claim 1, wherein the OS initialization varies according to the hardware structure and running conditions of each target board.

3. The method of claim 1, wherein an application program for each target board according to the function of the target board is stored as part of a single master application program and executed in the application execution step.

4. The method of claim 1, wherein common functions of the target boards are incorporated into the shared execution file.

5. The method of claim 1, wherein different functions of the target boards are implemented in branch sub-routines according to the target board IDs.

6. A method of sharing a program in a mobile communication system, comprising the steps of:
   storing by a main processor a master execution file in a memory, said master execution file compiled to contain program code to operate a plurality of target boards of the mobile communication system, said main processor apart from said plurality of target boards;
   executing by the main processor the master execution file for the plurality of target boards in the system when power is supplied to the system;
   reading by the main processor a target board identification (ID) of each target board;
   initializing by the main processor target board hardware according to the target board ID and the master execution file;
   initializing by the main processor an operating system (OS) for each target board using the target board ID and master execution file; and
   branching by the main processor into a sub-routine for each target board according to the target board ID and executing by the main processor an application program of the master execution file for each target board.

7. The method of claim 6, wherein the OS initialization varies according to the hardware structure and running conditions of each target board.

8. The method of claim 6, wherein an application program is compiled into the master execution file for each target board according to the function of the target board and executed in the application execution step.

9. The method of claim 6, wherein common functions of the target boards are incorporated into the master execution file.

10. The method of claim 6, wherein different functions of the target boards are implemented according to the target board IDs in branch sub-routines of the master execution file.

11. A system for sharing a program in a mobile communications system having a control unit and a plurality of target boards,
   wherein the control unit stores an execution file compiled to contain program code to operate each of the plurality of target boards according to a target board identification (ID), and
   the control unit includes a main processor for:
   executing the execution file for operating the plurality of target boards;
   reading the target board ID of each target board; and
   initializing target board hardware according to the target board ID;
   wherein the main processor:
   initializes an operating system (OS) for each target board using the target board ID; and
   branches into a sub-routine for each target board according to the target board ID.

* * * * *